United States Patent [19]

Boland et al.

[11] Patent Number: 5,055,979
[45] Date of Patent: Oct. 8, 1991

[54] GAS DISCHARGE LIGHT SOURCE

[75] Inventors: Steven H. Boland, Glendora; John S. Goldner, Azusa; James F. Weaver, Monrovia, all of Calif.

[73] Assignee: BHK, Inc., Pomona, Calif.

[21] Appl. No.: 462,079

[22] Filed: Jan. 8, 1990

[51] Int. Cl.$^5$ .............................................. F21V 7/04
[52] U.S. Cl. ..................................... 362/32; 313/111; 313/634; 385/39
[58] Field of Search ........................ 362/32, 261, 263; 313/110, 111, 631, 634; 350/96.1, 96.15

[56] References Cited

U.S. PATENT DOCUMENTS

| 3,770,338 | 11/1973 | Helmuth | 362/32 X |
| 4,159,510 | 6/1979 | Kovach et al. | 313/110 X |
| 4,403,167 | 9/1983 | Maitland et al. | 313/634 X |
| 4,757,427 | 7/1988 | Oostvogels et al. | 362/261 X |
| 4,847,534 | 7/1989 | der Kinderen | 313/631 X |
| 4,877,997 | 10/1989 | Fein | 313/634 |
| 4,896,073 | 1/1990 | Maitland et al. | 313/634 |

Primary Examiner—Stephen F. Husar
Attorney, Agent, or Firm—Boniard I. Brown

[57] ABSTRACT

A miniature gas discharge lamp having a direct physical connection with an end portion of an external optical fiber. Light generated within the lamp is directed against an end face of the optical fiber to cause light rays to travel within and along the fiber. The lamp has an elongated straight passage for containment of a radiation-producing gas, the passage being axially aligned with the optical fiber so that substantially all of the photon energy generated within the passage is optically connected to the end face of the fiber.

7 Claims, 4 Drawing Sheets

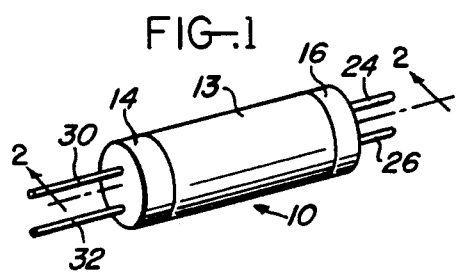
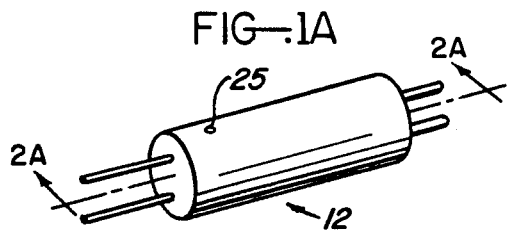
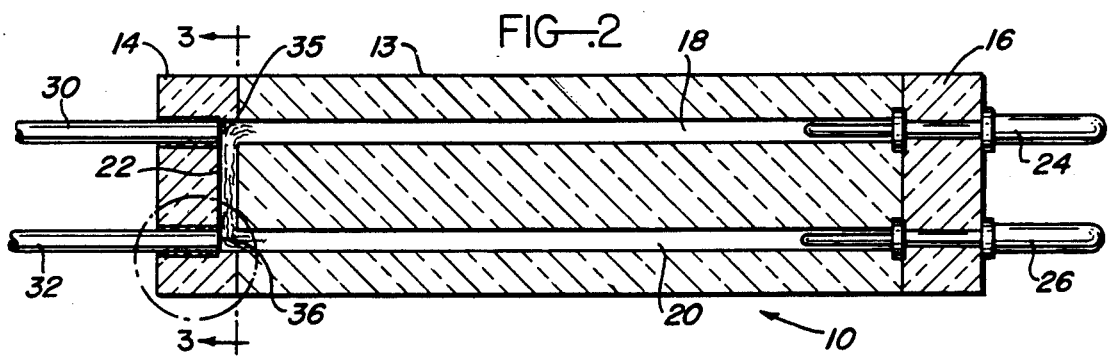
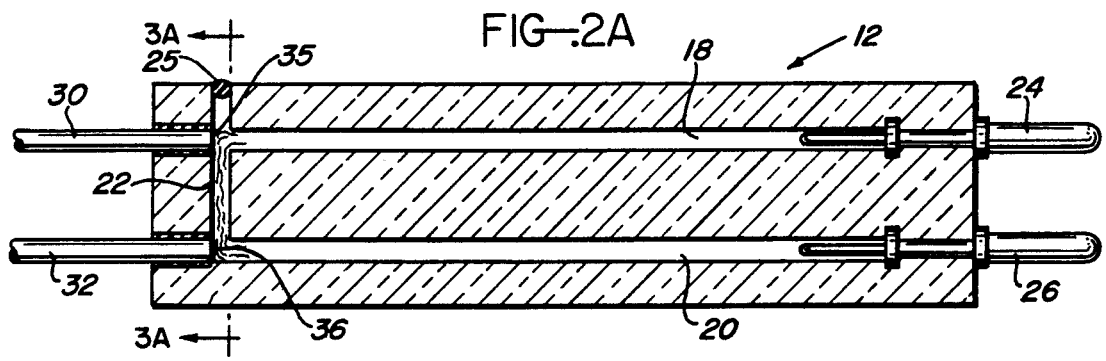
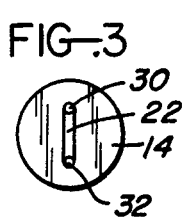
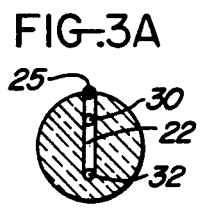
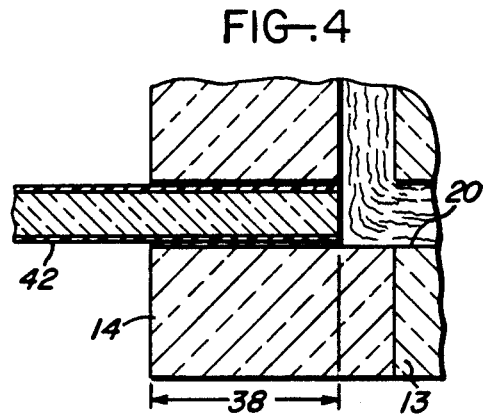

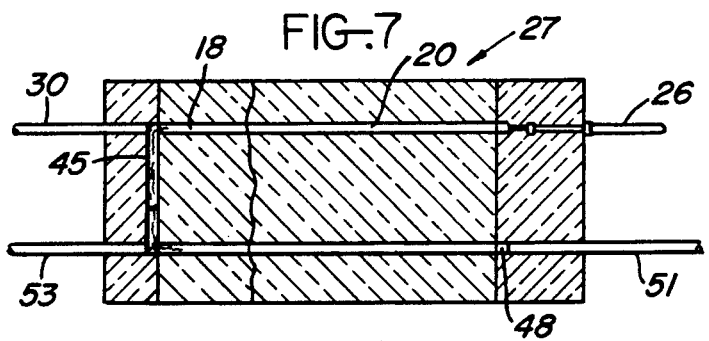
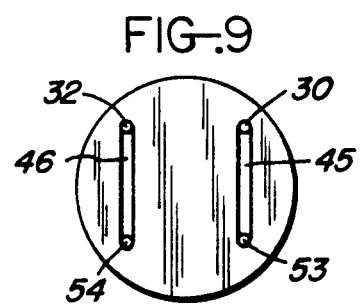
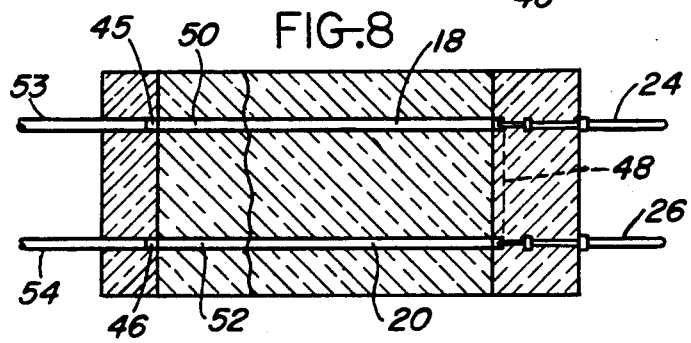
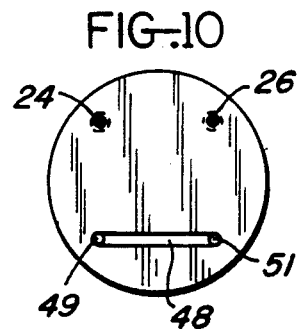
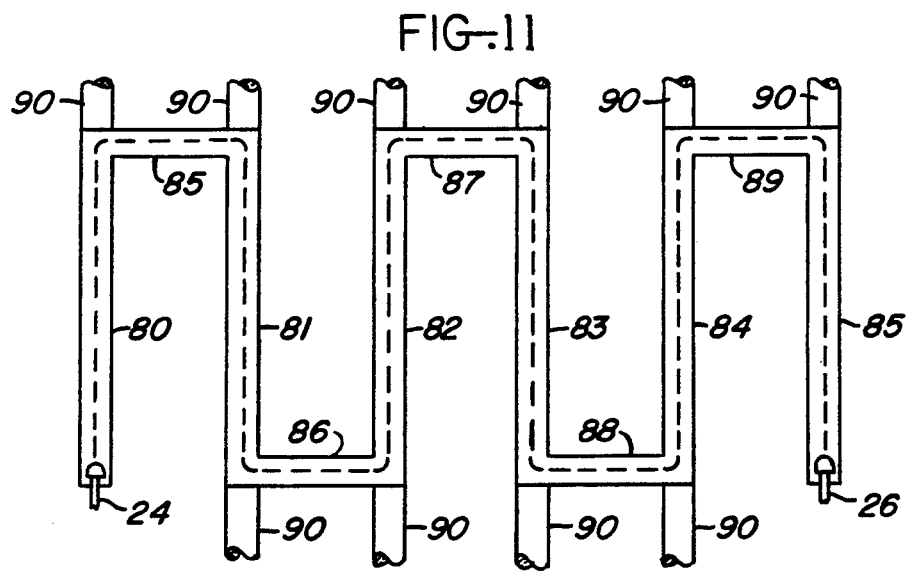
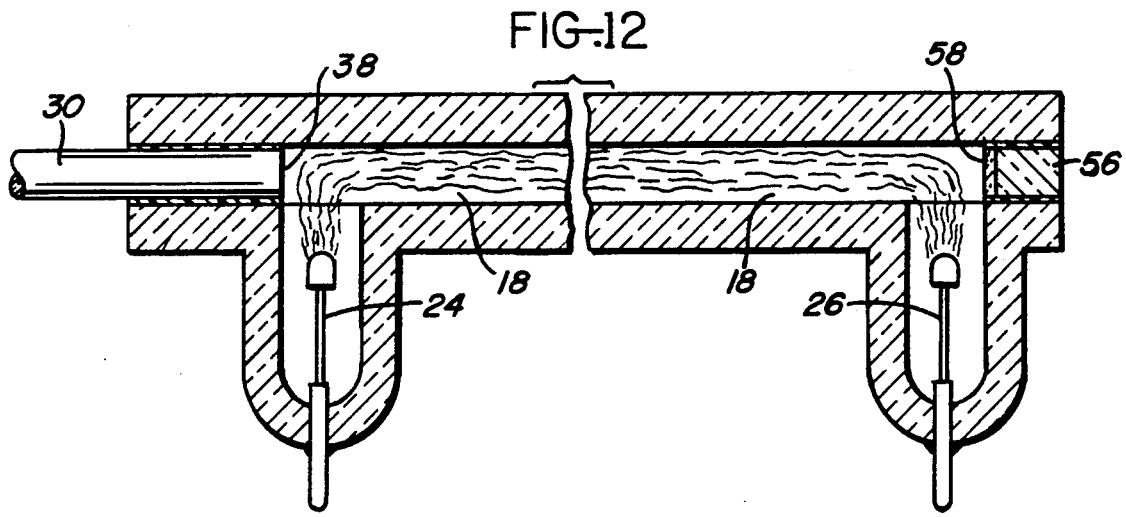

GAS DISCHARGE LIGHT SOURCE

BACKGROUND AND SUMMARY OF THE INVENTION

This invention relates to a light source for an optical fiber, and to a novel connection between the light source and the optical fiber. This proposed light source comprises a fiber optic illumination lamp having novel miniaturization capabilities. The improved lamp is an arc lamp having a high brightness output, with relatively low power consumption. The lamp may be used as a steady state light source or as a pulsed light source for transmission of information through the associated optical fiber(s). An important feature of the invention is that the arc lamp (gas discharge lamp) has a direct intimate connection with an end surface of at least one optical fiber. The gas discharge lamp includes a dielectric housing having a straight (linear) capillary passage that is charged with a radiation-producing gas. Electrodes communicate with the opposite ends of the capillary passage to produce an electron flow along the passage parallel to the passage axis. The electrons collide with the gas atoms to excite said atoms into the radiant state.

An end section of the optical fiber extends into one end of the capillary passage so that the end surface of the fiber is in direct optical communication with and in close proximity to the radiant gas. The fiber has a line-of-sight along the length of the capillary passage such that all photon energy in the passage is automatically made available to the optical fiber.

Since the optical fiber extends into the passage that contains the radiant gas, there is an automatic alignment of the fiber relative to the light source. The fiber has precise alignment with the source in an axial sense with minimal lateral misalignment of the two axes, and also in a transverse plane measured along the end surface of the fiber. The fiber end surface automatically extends at an optimum angle for acceptance of rays impinging thereon.

BRIEF DESCRIPTION OF THE DRAWINGS

FIG. 1 is a perspective view of a gas discharge lamp embodying the invention connected to two optical fibers.

FIG. 1A is a view taken in the same direction as FIG. 1, but showing a variant wherein the lamp housing is of one-piece construction.

FIG. 2 is a transverse sectional view on line 2—2 in FIG. 1.

FIG. 2A is a view similar to the view of FIG. 2 taken at line 2A—2A in FIG. 2.

FIG. 3 is a transverse sectional view on line 3—3 in FIG. 2.

FIG. 3A is a transverse sectional view on line 3A—3A in FIG. 2A.

FIG. 4 is an enlarged fragmentary sectional view of the structural detail circled at 4 in FIG. 2.

FIGS. 7 through 10 are sectional views taken respectively on lines 7—7, 8—8, 9—9 and 10—10 in FIG. 6.

FIG. 11 is a diagrammatic showing of a passage arrangement that may be employed in accordance with the invention.

FIG. 12 is a sectional view taken through another device according to the invention.

DESCRIPTION OF THE PREFERRED EMBODIMENT

Figure 5:
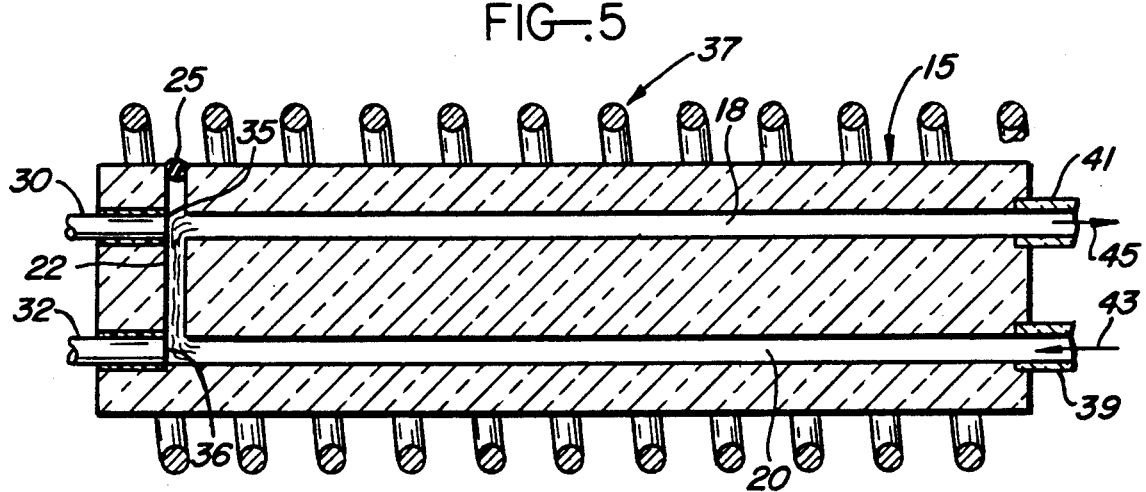
FIG. 5 is an elevational sectional view of another gas discharge lamp embodying the invention, wherein there are utilized an electrical coil for producing gas excitation and a dynamic flow of gas.

FIGS. 1 through 4 illustrate two preferred embodiments 10 and 12 of the present invention. The gas discharge lamp 10 of FIG. 1 comprises an elongated cylindrical dielectric housing element 13 and two end caps 14, 16 secured, as by adhesive, to end surfaces of housing element 13. The devices according to the invention may take various configurations, other than cylindrical.

Two elongated straight capillary passages 18 and 20 extend within the housing. The caps 14, 16 have holes or passages defined therein which are in alignment with passages 18, 20, as shown. The holes in cap 14 may have the same diameter as the passages. Transverse passage 22 is formed by drilling a hole which connects the bores or passages 18 and 20.

End cap 14 serves the important purpose of receiving the optical fibers 30, 32 to automatically position and orient the fibers to extend axially into the arc chamber or passage 22. The important result is thus provided that the end faces of the optical fibers are positioned in close proximity to the optical output of the radiation-producing gas or vapor in the passage or passages.

Electrodes 24, 26 are shown only schematically; the electrodes utilized may take various forms in accordance with practice in the arc lamp industry. Thus, each electrode may take the form of a tungsten wire coiled about a tungsten pin with a molybdenum foil vacuum seal thereabout, thus to provide a hermetic vacuum-tight seal. An electrode may also be utilized which comprises a molybdenum hairpin. The portion of the electrode disposed within the lamp envelope space or chamber may have a hairpin or a helical coil configuration. Electrode constructions which may be utilized are described in U.S. Pat. No. 4,810,924 to M. Jelic.

As shown in FIGS. 2 and 2A, optical fibers 30 and 32 have end sections thereof extending into the holes, with end surfaces 35 and 36 of the fibers being positioned in close proximity to transverse passage 22. Each optical fiber will ordinarily be a flexible element having a length determined by the installation—i.e., the distance from the light source to the non-illustrated detector or connector. Each fiber could be a non-flexible rod element.

Sealed connections are provided between the end sections or portions of the fibers and the holes or openings in which they are positioned, thus to provide a closed passage system comprising the passages 18, 20 and 22.

A controlled atmospheric condition is provided in the space or chamber defined by the passages 18, 20 and 22 by vacuumizing the chamber or passages and charging into the chamber or passages a radiation-producing gas or vapor of a vaporizable material. Any of the various gases known to produce radiation when subjected to electron excitation, or combinations of such gases, can be utilized, such gases including argon, neon, krypton, xenon, deuterium, hydrogen, nitrogen, chlorides, iodides, bromides, or fluorides. The vapors of vaporizable compounds may be utilized, such compounds or materials comprising zinc, mercury, cadmium, indium alloys, etc.

Passages 18 and 20 have the same, or approximately the same, diameters as optical fibers 30 and 32, such that substantially all of the photon energy produced endwise in and along these passages is optically connected to the end surfaces of fibers 30 and 32, without need for a lens or reflectors for concentrating the optical energy. Typically, passages 18 and 20 will have diameters in the range between 0.001 inch and larger; the optical fibers will be similarly dimensioned.

During service the application of an electrical voltage across electrodes 24 and 26 produces an electron flow longitudinally along the two straight passages 18 and 20, and the interconnecting passage 22. The electron flow paths parallel the axes of the respective passages, such that the electrons collide with a significant percentage of the gas atoms, thereby exciting the atoms into the radiant state.

Each of the straight passages 18, 20 has a length several times its transverse diametrical dimension. The relatively long length of each passage 18 and 20, and the axial aligned orientation of each fiber relative to the passage axis, cause each fiber to see a relatively high photon density and optical brightness. Each fiber has a substantial end section thereof inserted into the associated hole in the end cap or the housing body, thus to position the end surface of the fiber in close proximity to the arc chamber or passage, by insertion of the fiber through the cap of FIG. 1 or the housing body of FIG. 1A, with no special alignment procedure being required. The inserted length 38 (FIG. 4) of a fiber should be sufficient to enable the provision of appropriate sealing and support for the fiber, and may be two or three times the transverse diameter of the fiber.

Each inserted fiber has an end surface 35 that can extend normal to the axis of the fiber and associated passage 18 or 20. As shown in FIG. 4, the side surface of the optical fiber has a cladding layer 42 thereon, but such a cladding may not be necessary in all cases. When cladding is used, the cladding material will have a refractive index less than that of the core material.

The gas discharge lamps 10, 12 may be formed of any appropriate material, typically such dielectric materials as glasses, ceramics, quartz, etc. Some materials may be more conducive to economical formation of passages 18, 20 and 22, and the mounting holes for the electrodes and fiber end sections. In one arrangement utilizing ceramic materials, the transverse passage 22 is formed before end cap 14 is applied to lamp housing 10. The passages 18 and 20, and the mounting holes, are formed by assembling the end caps to lamp housing 10, and then drilling straight holes through the assembled components. Methods other than drilling can be used to form the various holes and passages—e.g., laser penetration, drawing, molding, or investment casting.

FIG. 2 shows an arrangement wherein two optical fibers are operatively attached to a gas discharge lamp housing. In many cases only one optical fiber would be employed; thus, end cap 14 would have only one mounting hole therethrough. The optical energy transmitted through each fiber will have the spectrum characteristic of the gas charged into lamp housing 10.

FIGS. 1A, 2A and 3A show a lamp structure 12 that is operationally similar to the structure shown in FIGS. 1 through 3. Unlike the embodiment of FIG. 1, the lamp housing is of unitary, one-piece construction. Similar components are identified by similar reference numbers in the various Figures of the drawings. In the arrangement shown in FIG. 2A, the transverse passage 22 is formed by a bore or hole in the housing which is closed by a sealing plug 25, which may be cylindrical or spherical in configuration.

FIG. 5 illustrates an embodiment of the invention with certain features similar to those of the embodiment of FIG. 2A designated by similar reference numerals, wherein excitation of gas in the housing passages 18, 20 is effected by an electrical coil 37 disposed about a lamp structure 15 to produce appropriate microwave or radio frequency energy. Antenna means (not shown) may also be utilized to produce the appropriate frequency for gas excitation. In this embodiment, dynamic gas flow is provided through the passages 18, 20, the gas entering via conduit 39 and exiting through conduit 41, as indicated by directional arrows 43 and 45. The gas flow is produced by an appropriate pump and circulation arrangement (not shown). By the elimination of electrodes, corrosion or oxidation of electrodes by gas impurities is eliminated. Electrodes are exposed to such impurities in gas in many applications, such as, for example, in the analysis of automobile exhaust gases passing through the devices.

Figure 6:
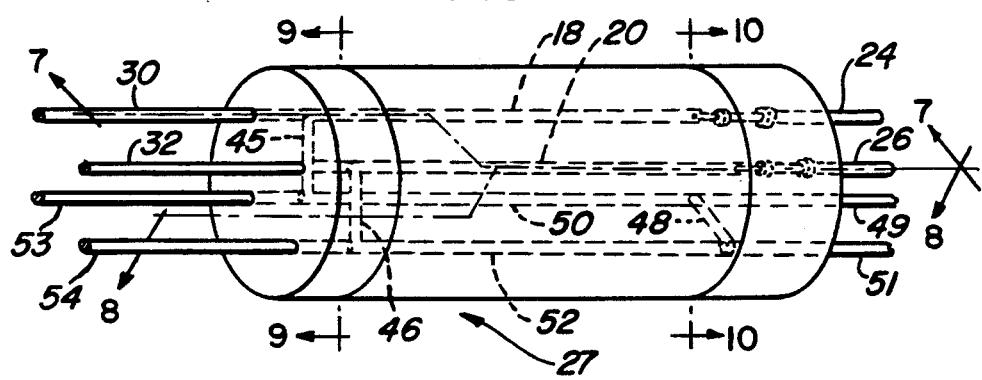
FIG. 6 is a perspective view of another gas discharge lamp embodying the invention.

FIG. 6 shows another embodiment of the invention, wherein a three-piece housing is configured to define four straight elongated passages, rather than two straight elongated passages, as shown in FIG. 2A. In the FIG. 6 arrangement, two electrodes 24 and 26 extend into one end of the dielectric housing and are coaxial with straight passages 18 and 20. Optical fibers 30 and 32 extend into the other ends of passages 18 and 20; the relationship is similar to that shown in FIG. 2.

The connection between passages 18 and 20 includes a series of short transverse passages and connected elongated passages 50 and 52 paralleling passages 18 and 20. The transverse passages comprise two passages 45 and 46 extending downwardly (FIG. 6) from passages 18 and 20, and a third transverse passage 48 extending between the two elongated straight passages 50 and 52. Optical fibers 30, 32, 53 or 54 extend into housing 27 in axial alignment with the elongated passages 18, 20, 50 and 52. As an option, additional fibers 49 and 51 can extend into optical axial alignment with passages 50 and 52 in the space below electrodes 24 and 26 (FIG. 6). Each optical fiber optically views the radiation generated in the associated longitudinal passage.

Figure 6A:
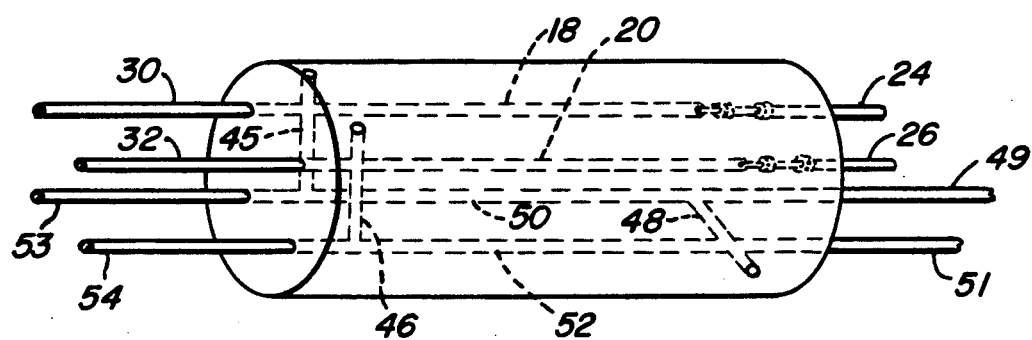
FIG. 6A is a perspective view taken in the same direction as FIG. 5, but showing a one-piece housing construction.

FIG. 6A shows a structure that is operationally similar to the FIG. 6 structure. The essential difference between the two structures lies in the fact that the FIG. 6 structure includes a three-piece housing, whereas the FIG. 6A structure uses a one-piece unitary housing construction. In FIG. 6A, the transverse passages 45, 46 and 48 may have their exposed ends sealed by means of plugs similar to plug 25 (FIG. 2A).

The arrangements shown in FIGS. 6 and 6A utilize zig-zag serpentine passage constructions, wherein each straight elongated passage is connected to the adjacent elongated passage via a short transverse passage. FIG. 11 illustrates this zig-zag type passage formation in an unfolded "flat" state. In FIG. 11, the elongated linear passages that form the optical source are identified by numerals 80, 81, 82, 83, 84 and 85. The connecting transverse passages are referenced by numerals 85, 86, 87, 88 and 89. The associated optical fibers are identified by numeral 90. The dashed line in FIG. 11 indicates the electron flow path between the two electrodes 24 and 26. Each of the optical fibers 90 is optically aligned with one of the straight elongated passages 80 through 85.

The number of optical passages may be increased beyond the six passages shown in FIG. 11. The passages need not be arranged in a "flat" configuration, as shown in FIG. 11. Instead, the passages can be arranged in a three dimensional ring pattern, as shown in FIGS. 6 and 6A. The various optical fibers may have their output (detector) ends bundled together to produce a single light output that is a multiple of the lumens generated in the input end of each optical fiber. The use of a multiple number of fibers can be a way of producing enhanced optical output. Alternately, the individual fibers can be arranged to direct a given optical signal to various different detectors physically separated from one another.

In the various structural arrangements depicted in FIGS. 1 through 11, the energizing electrodes (anodes and cathodes) are in axial alignment with the associated ionizing passages 18, 20, etc. Such axial alignment is not essential to the invention. FIG. 12 shows two electrodes 24 and 26 arranged in short transverse passages communicating with opposite ends of a single straight elongated capillary passage 18 containing a radiation-producing gas. This electrode arrangement is somewhat similar to the electrode arrangement shown in patent application Ser. No. 07/157,731.

FIG. 12 illustrates a laser embodiment in accordance with the invention, wherein one end of passage 18 is closed by end face 38 of an optical fiber 30. End face 38 is coated with a partially reflective coating. The opposite end of the passage 18 is closed or sealed by a sealing plug 56 which has an interior end surface 58 which has a fully reflective mirror coating, thus to minimize absorption of photon energy.

Figure 13:
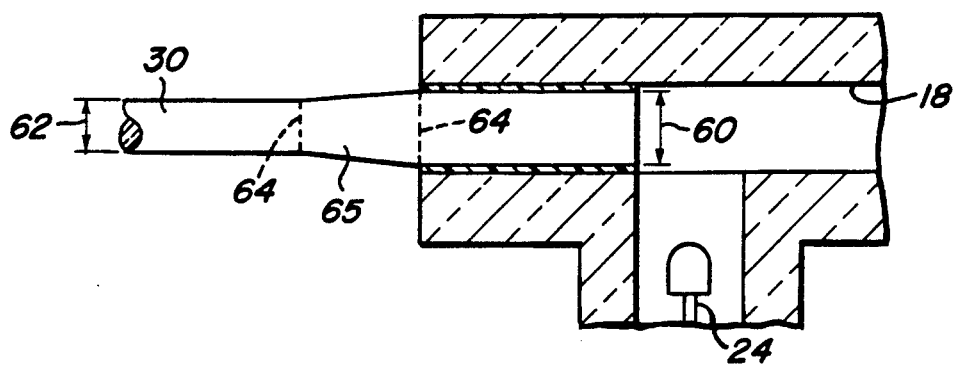
FIG. 13 is a fragmentary sectional view taken through a variant of the FIG. 12 structure.

FIG. 13 is a fragmentary view which illustrates a variation of the embodiment shown in FIG. 12. As shown in FIG. 13, the inserted end section of the optical fiber has a diameter 60 somewhat greater than the diameter 62 of the optical fiber along its major length. A tapered transition section 65 extends between the fiber main section and the fiber end section. Imaginary lines 64 designate the limits of the transition section 65 between the large diameter end section of the fiber and the relatively small diameter principal or major section of the fiber.

The purpose of the diameter difference (at 60, 62) is to concentrate the optical energy in the major length of the fiber. Thus, the larger diameter end section of the fiber will capture a larger quantity of light energy than would a fiber having a smaller diameter—e.g., diameter 62. The transition section 65 will focus the energy into the smaller diameter section of the fiber, thereby producing a somewhat brighter condition at the output end of the fiber. Optical energy will be totally contained within the fiber if the taper (transition) angle is no greater than about five degrees.

Figure 14:
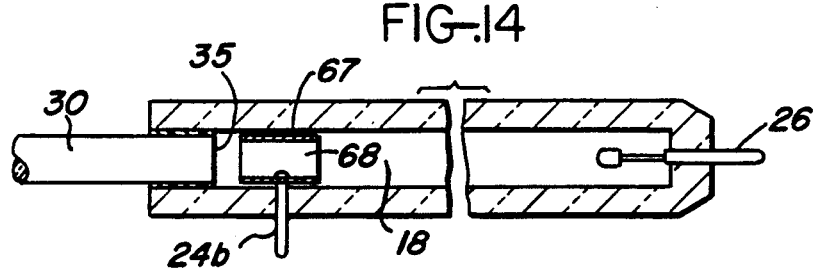
FIGS. 14 and 15 are sectional views through further structural arrangements that may be employed in practice of the invention.

FIG. 14 illustrates a form of the invention wherein one of the electrodes 24b includes an electrically conductive annulus 67 coaxial with capillary passage 18. The conductive annulus defines a central space 68 of sufficient diameter to transmit optical radiation from passage 18 into the end surface 35 of optical fiber 30.

Figure 15:
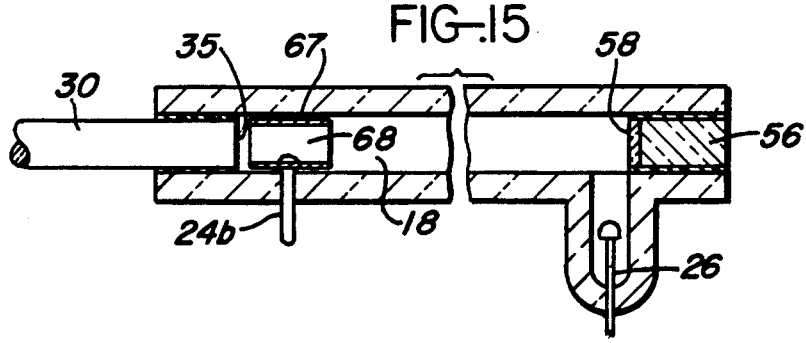

FIG. 15 shows an arrangement that is structurally similar to the FIG. 14 arrangement, except that electrode 26 is located in a short transverse passage, similar to the arrangement depicted in FIG. 12.

Figure 16:
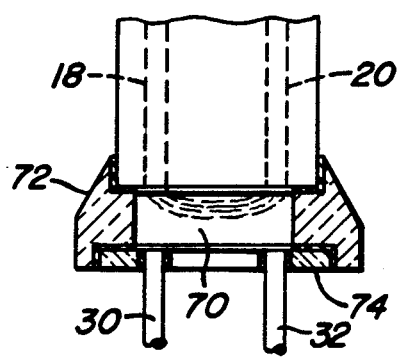
FIG. 16 is a fragmentary view through a gas discharge lamp embodying the invention, showing a collar structure for coupling the lamp to two optical fibers.

FIG. 16 fragmentarily shows an arrangement wherein two elongated straight passages 18 and 20 have their adjacent ends communicating with a connector space 70 formed by an annular collar 72 and a relatively thick end plate 74. Two optical fibers 30 and 32 have their end sections extended into holes in plate 74, such that the fibers are optically aligned with passages 18 and 20. The non-illustrated ends of passages 19 and 20 accommodate electrodes similar to electrodes 24 and 26 shown in FIGS. 2 and 2A.

FIG. 16 shows another form of the invention. It may be noted that the embodiment shown in FIGS. 1 and 2 incorporate the preferred connection of optical fibers to lamp housings, the optical fibers being precisely aligned with the associated linear capillary passages, because the mounting holes for the optical fibers are axial extensions of the passages or end sections of the passages. In the embodiment of FIG. 16, the alignment of fibers relative to passages 18 and 20 depends on dimensional tolerances of collar 72 and the mounting holes in plate 74. If the various passages and holes are formed at the same time (after plate 74 and collar 72 are installed on the capillary housing), the passages and holes will be aligned so that tolerances are not a factor.

Figure 17:
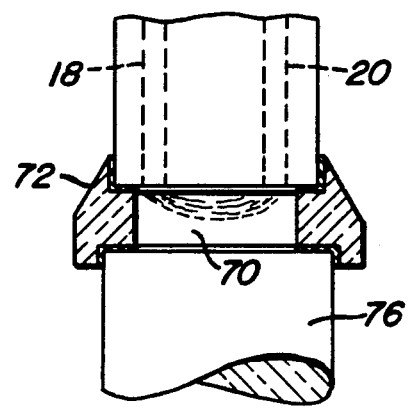
FIG. 17 is a view taken in the same direction as FIG. 15, but showing a collar type connection member for connecting the lamp to a large rod optical transmitter.

FIG. 17 shows an arrangement that is generally similar to FIG. 15, except that the two flexible optical fibers 30 and 32 are replaced by a single rigid optical rod 76 of an indeterminate length. The single rod will transmit optical signals from the illustrated end of the rod to the remote non-illustrated output end of the rod. The signal produced at the output end of the rod will be a composite signal representing the photon energy generated in both passage 18 and 20. This composite signal will be distributed across the relatively large rod cross sectional area. Hence, the output signal will not have the same brightness as the signal associated with individual fibers 30 and 32. However the rod 76 cross-section overlaps the cross-section of the passage, thereby eliminating any misalignment problem. This embodiment is particularly useful with fibers or multiple fibers which taper to a smaller size, in the general manner indicated in FIG. 13, to provide enhanced brightness output, either a single fiber or multiple fibers or channels (not shown) tapering down to a smaller size.

Although various embodiments of the invention are shown in the drawings, the invention can take other forms. A principal aim of the invention is to provide a light source that includes at least one straight (linear) elongated passage containing a radiation-producing gas. The associated optical fiber (or rod) has a straight end section attached to the light source housing, such that the fiber is in direct axial optical alignment with and in close proximity to the straight passage(s). The diameter of the passage is preferably substantially the same as the diameter of the fiber section inserted into the lamp housing, whereby substantially all of the photon energy generated in the passage is potentially capable of being coupled into the optical fiber.

The gas discharge lamp may be energized (operated) as a steady state device or as a pulsed device. Since there are known radiation-producing gases having relatively short excitation and decay times (millionths of seconds), it becomes possible to readily transmit and reproduce short duration pulses, using the described discharge lamp.

It is also possible to vary the light output of the gas discharge lamp by making instantaneous adjustments in the current supplied to the lamp electrodes. For example, if the current supply source includes a device coupled to a voice-activated amplifier, the light output of the lamp will be modulated to reproduce the wave fronts associated with voice activation.

Thus there has been shown and described a novel gas discharge light source which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventors claim:

1. A light source comprising:
   a dielectric housing,
   at least one elongated constant cross-section straight passage extending within said housing, said passage having a longitudinal axis defining a passage length several times the passage transverse dimension,
   a radiation-producing gas disposed in said passage,
   means for producing an electron flow along the passage parallel to said longitudinal axis, whereby the flowing electrons collide with the gas atoms to excite the atoms into the radiative state, and
   a single external flexible optical fiber having a straight attachment end section telescoped into said straight passage so that the side surface of the fiber has a sealed connection with the side surface of the passage, said optical fiber having an end surface in direct contact with the radiation-producing gas, whereby light emitted by the gas flows directly into the optical fiber, the axis of the fiber attachment end section being optically aligned with the passage axis,
   the attachment end section of the optical fiber having an axial length appreciably greater than the transverse dimension of the fiber measured normal to the fiber axis to provide a secure connection between the fiber and the housing.

2. A light according to claim 1, wherein:
   said optical fiber has a relatively small transverse dimension along its major principal length, and a relatively large transverse dimension measured along its attachment section, said fiber having a tapered transition section connecting the attachment section to the principal length of the fiber.

3. A light source according to claim 2, wherein:
   said tapered transition section has a taper angle no greater than about five degrees.

4. A light source according to claim 1, and comprising:
   a plurality of elongated straight passages extending within said housing, and
   a plurality of connector passages extending between adjacent ones of the straight passages at selected ends thereof, said straight passages and said connector passages collectively defining a serpentine passage system within the housing.

5. A light source according to claim 3, and further comprising:
   a flexible optical fiber optically connected to each elongated straight passage, each optical fiber having a straight attachment end section telescoped into the associated straight passage.

6. A light source according to claim 5, wherein:
   said elongated straight passages are mutually parallel.

7. A light source according to claim 1, wherein:
   the straight passage has capillary dimensions.

* * * * *